United States Patent

Hu et al.

(10) Patent No.: US 8,559,999 B2
(45) Date of Patent: Oct. 15, 2013

(54) CHANNEL QUALITY PREDICTION IN HSDPA SYSTEMS

(75) Inventors: Rong Hu, Beijing (CN); Muhammad Kazmi, Bromma (SE); Hai Wang, Beijing (CN); Jonas Fröberg Olsson, Ljungsbro (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1050 days.

(21) Appl. No.: 12/301,854

(22) PCT Filed: May 29, 2006

(86) PCT No.: PCT/SE2006/050160
§ 371 (c)(1),
(2), (4) Date: Nov. 21, 2008

(87) PCT Pub. No.: WO2007/139459
PCT Pub. Date: Dec. 6, 2007

(65) Prior Publication Data
US 2010/0234058 A1    Sep. 16, 2010

(51) Int. Cl.
*H04B 7/185* (2006.01)
*H04B 7/00* (2006.01)

(52) U.S. Cl.
USPC .......................................... 455/522; 370/318

(58) Field of Classification Search
USPC .......................................... 455/522; 370/318
See application file for complete search history.

(56) References Cited

U.S. PATENT DOCUMENTS

| | | | |
|---|---|---|---|
| 7,006,464 B1* | 2/2006 | Gopalakrishnan et al. | 370/328 |
| 7,412,212 B2* | 8/2008 | Hottinen | 455/101 |
| 7,711,030 B2* | 5/2010 | Perlman | 375/141 |
| 7,801,563 B2* | 9/2010 | Hara et al. | 455/562.1 |
| 7,835,700 B2* | 11/2010 | Zeira | 455/63.1 |
| 7,912,490 B2* | 3/2011 | Pietraski | 455/522 |
| 2003/0076870 A1* | 4/2003 | Moon et al. | 375/130 |
| 2003/0108025 A1* | 6/2003 | Kim et al. | 370/342 |
| 2003/0129992 A1* | 7/2003 | Koorapaty et al. | 455/456 |
| 2003/0142647 A1* | 7/2003 | Agrawal et al. | 370/331 |
| 2004/0008644 A1* | 1/2004 | Holtzman et al. | 370/329 |
| 2004/0066754 A1* | 4/2004 | Hottinen | 370/252 |
| 2004/0142698 A1* | 7/2004 | Pietraski | 455/452.2 |
| 2004/0198234 A1* | 10/2004 | Wacker et al. | 455/67.13 |
| 2004/0203475 A1* | 10/2004 | Gaal | 455/69 |
| 2006/0063505 A1* | 3/2006 | Cairns | 455/302 |
| 2007/0255993 A1* | 11/2007 | Yap et al. | 714/748 |
| 2009/0305712 A1* | 12/2009 | Franceschini et al. | 455/450 |
| 2009/0310588 A1* | 12/2009 | Padovani et al. | 370/342 |
| 2011/0158150 A1* | 6/2011 | Kawamura et al. | 370/312 |
| 2011/0170438 A1* | 7/2011 | Kishiyama et al. | 370/252 |
| 2012/0300653 A1* | 11/2012 | Kishiyama et al. | 370/252 |

FOREIGN PATENT DOCUMENTS

EP    1180858 A1    2/2002

* cited by examiner

*Primary Examiner* — Bobbak Safaipour

(57) ABSTRACT

A method and arrangement in a radio communication network for predicting channel quality on a downlink channel. A radio base station (RBS) transmits data on the downlink channel to one or more user equipments (UEs), each of which transmits a channel quality indicator to the RBS on an uplink channel. The RBS derives a needed downlink transmission power from the received channel quality indicator, and predicts a channel quality for a next downlink transmission based on the received channel quality indicator and the derived downlink transmission power.

13 Claims, 4 Drawing Sheets

CHANNEL QUALITY PREDICTION IN HSDPA SYSTEMS

TECHNICAL FIELD

The present invention relates to a method and an arrangement in a communication system, and in particular to an arrangement allowing for predicting a channel quality on a downlink channel as well as a method for such prediction. The invention further relates to a computer-readable medium containing computer program for predicting a channel quality on a downlink channel.

BACKGROUND OF THE INVENTION

In high speed (HS) systems, the downlink (DL) carrier power varies very much TTI by TTI due to the nature of packet burst transmission, causing much fluctuation in the intra-cell interference. Transmission Time Interval (TTI) is defined as the inter-arrival time of a Transport Block Set (TBS), and is equal to the periodicity at which a Transport Block Set is transferred by the physical layer on the radio interface. It is always a multiple of the minimum interleaving period. The Medium Access Control (MAC) delivers one Transport Block Set to the physical layer every TTI.

The Channel Quality Indicator (CQI) is a quantized indicator of the channel quality experienced by the user equipment, and may for example comprise a carrier/interference ratio (C/I) quantized into a predetermined range of dB values. The CQI is generally broadcast at a high rate, e.g., 800 Hz, or once every 1.25 msec. The CQI thus provides a high rate channel feedback mechanism to report the relative C/I at each user equipment. The reported Channel Quality Indicator (CQI) from a user equipment (UE) to the corresponding base station reflects the channel quality only for the previous TTI, not the channel quality that the data will experience in current TTI.

The main problem with CQI reports not mirroring actual channel conditions will be that the radio access network (RAN), such as the UMTS Terrestrial RAN (UTRAN), performs the link adaptation based on faulty data leading to an inefficient use of the high speed-downlink shared channel (HS-DSCH). This will manifest either by excessive retransmissions in case the UE overestimates the channel or by lower throughput and wasted capacity in case the UE underestimates the current channel conditions.

Deviating CQI reports may also lead to faulty scheduling decisions since the channel condition is an input to the scheduling selection algorithm in the cases where proportional fair (PF) or max carrier-to-interference (C/I) scheduling schemes are employed. Thus a UE that consistently overestimates the channel will be rewarded by more frequent scheduling.

Existing solutions to the above problem focus on the CQI adjustment to improve its accuracy, which are mainly based on three input parameters, namely, the downlink transmission power control (DL TPC), MAC-hs acknowledgement/negative acknowledgement (ACK/NACK) rate and Doppler estimation.

Obviously, the existing solutions put efforts to improve the received CQI accuracy. However, the fact is that even without any CQI generation error at UEs or CQI transmission error in the uplink (UL), the perfect received CQI reflects the channel quality still only for previous TTI. In addition, using MAC-hs ACK/NACK rate based CQI adjustment, which is a typical solution, could cause one risk that if no HS data transmission and therefore no ACK/NACK reporting, the CQI adjustment can't be performed.

SUMMARY OF THE INVENTION

Accordingly, it is an objective with the present invention to provide an improved method for predicting a channel quality on a downlink channel in a communication network comprising a communication network entity transmitting data on said downlink channel over a radio interface to one or more user equipments, each of which is transmitting data on an uplink channel to said communication network entity over said radio interface.

A further objective with the present invention is to provide an improved arrangement for predicting a channel quality on a downlink channel in a communication network comprising a communication network entity transmitting data on said downlink channel over a radio interface to one or more user equipments, each of which is transmitting data on an uplink channel to said communication network entity over said radio interface A still further objective with the present invention is to provide an improved computer-readable medium for predicting a channel quality on a downlink channel in a communication network comprising a communication network entity transmitting data on said downlink channel over a radio interface to one or more user equipments, each of which is transmitting data on an uplink channel to said communication network entity over said radio interface Thanks to the provision of a method and an arrangement which predicts the channel quality on the downlink channel, the risk of the user equipment overestimating the channel condition is decreased which reduces the retransmission times, the risk of underestimating conditions is decreased which increases the throughput and capacity, there will be a faster converge to the power control steady state since the transmission power directly is adjusted to reach the required SIR target at the first slot of every TTI. Further, the inventive method and arrangement do not require a standard change.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF PREFERRED EMBODIMENTS

Figure 1:
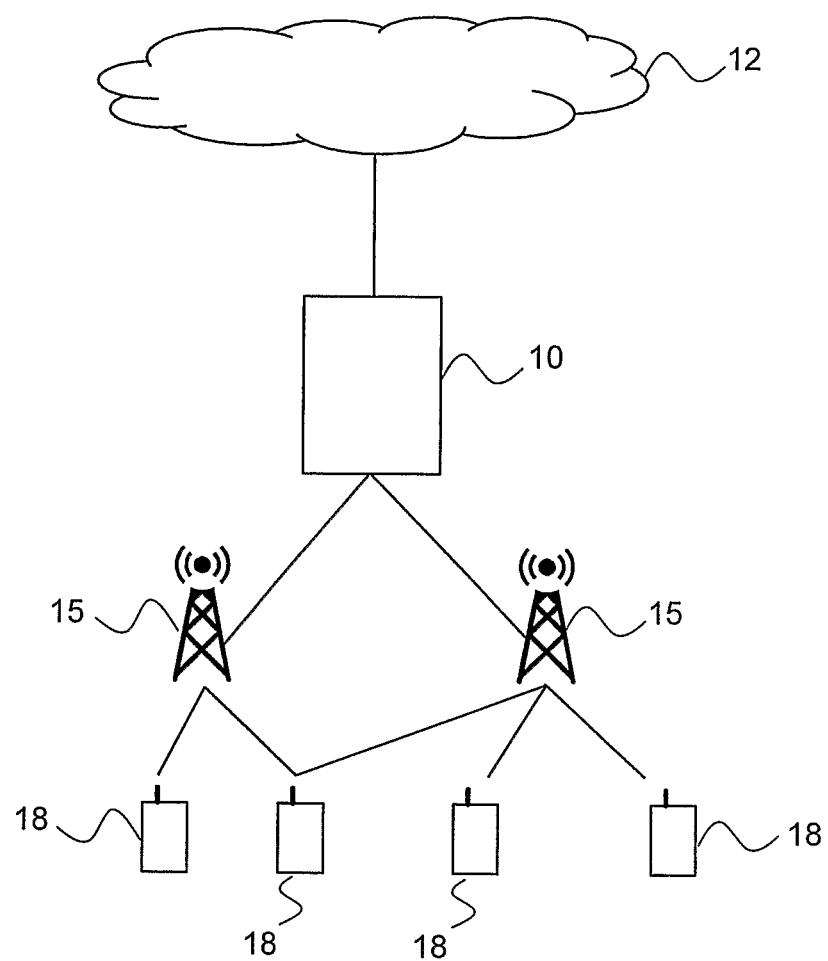
FIG. 1 shows the communication network architecture according to the present invention.

FIG. 1 depicts a communication system such as a CDMA communication system including a Radio Access Network (RAN), such as the UMTS Terrestrial Radio Access Network (UTRAN) architecture, comprising at least one Radio Base Station (RBS) (or Node B) 15 (two are shown in FIG. 1) connected to one or more Radio Network Controllers (RNCs) 10. The RAN is connected to a Core network (CN) 12. The RAN and the CN 12 provide communication and control for a plurality of user equipments (UE) 18 that each uses downlink (DL) channels (i.e. base-to-user or forward) and uplink (UL) channels (i.e. user-to-base or reverse). On the downlink channel, the RBS 15 transmits to each user equipment 18 at respective power level. On the uplink channel, the user equipments 18 transmit data to the RBS 15 at respective power level.

In the present invention the base stations (Node Bs) predict the channel quality by using the available DL transmitted power and estimating the orthogonality together with the received CQI reports. Thus, the inventive idea is to predict what radio quality the data will experience, rather than the prior art approaches which are based on radio channel quality for previous TTIs.

A normalized signal-to-interference ratio (SIR) is defined in this context as the pathgain over the interference, which can be expressed as:

$$\frac{g}{I_{TTI}} = \frac{1}{\alpha P_{total\_TTI} + P_{non\text{-}orth} + \frac{I_{other+noise}}{g}} \quad (1)$$

Where $\alpha$ is the DL orthogonality, $P_{total\_TTI}$ is the DL total transmission power, $P_{non\text{-}orth}$ is the DL non-orthogonal power, g is the DL pathgain and $I_{other+noise}$ is the total interference plus noise. It should be noted that, hereinafter, for simplicity no differentiation is made between the term "CQI" and "the normalized SIR".

Based on equ. (1), the relation between normalized SIRs for two consecutive TTIs can be expressed as:

$$\frac{g}{I_{TTI2}} = \frac{1}{\frac{I}{g_{TTI1}} + \alpha \cdot (P_{total\_TTI2} - P_{total\_TTI1})} \quad (2)$$

$$P_{total\_TTI} = P_{non\text{-}hs} + P_{HS\text{-}SCCH} + P_{HS\text{-}DSCH} \quad (3)$$

Figure 2:
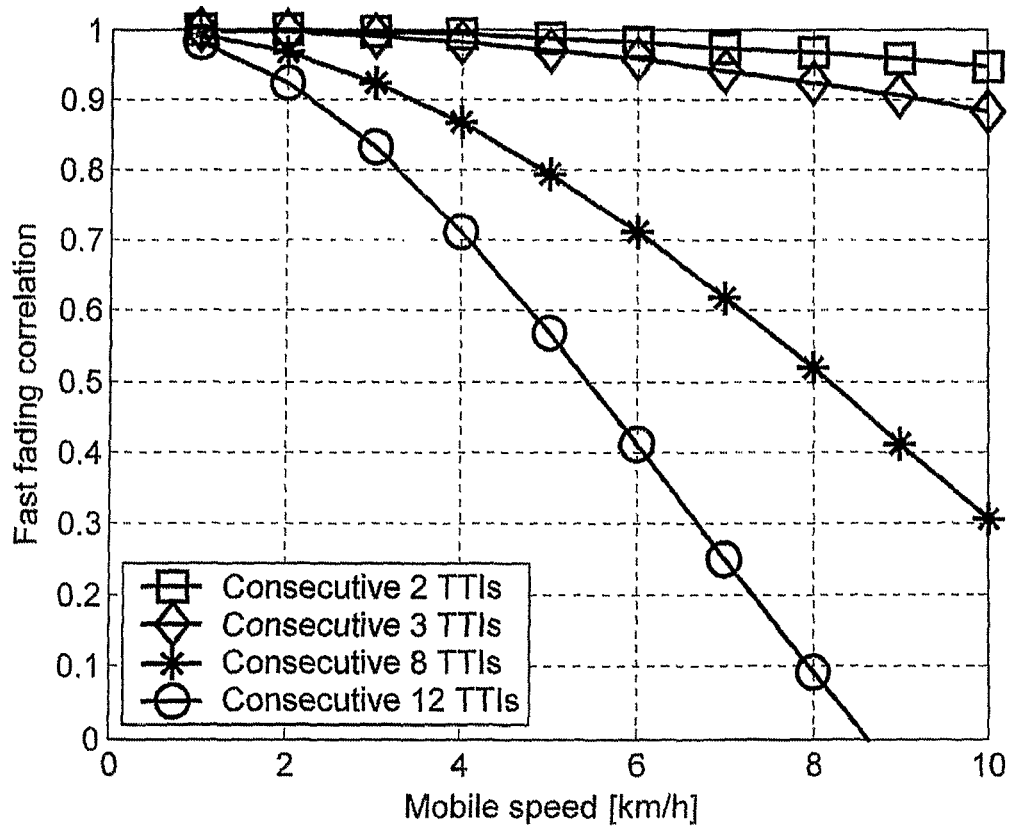
FIG. 2 is a diagram showing fast fading correlation vs user equipment speed.

Here the orthogonality $\alpha$ and inter-cell interference are assumed to be constant in consecutive two TTIs. FIG. 2 shows the fast fading correlation, where for a typical mobile speed of 3 km/h, there is much high fast fading correlation even for consecutive 8 TTIs. Therefore assuming a roughly constant for two consecutive TTIs is reasonable. Compared to the intra-cell interference, the inter-cell interference is assumed to be not dominant. $P_{total\_TTI1}$ for TTI1 is already known at TTI2 while $P_{total\_TTI2}$ can be assumed to be the max available power.

One way to estimate the orthogonality $\alpha$ for TTI2 is based on data from previous two TTIs (TTI0 and TTI1) as shown in equ. (4). Then the derived a will be used for TTI2.

$$\alpha = \frac{\frac{I}{g_{TTI1}} - \frac{I}{g_{TTI0}}}{P_{total\_TTI1} - P_{total\_TTI0}} \quad (4)$$

Similarly, the orthogonality $\alpha$ for TTI3 can be derived based on data from TTI2 and TTI1.

In some radio environments, the intra-cell interference is absolutely dominant, compared to the inter-cell interference plus noise. Therefore, the term of the inter-cell interference plus noise in eqv. (1) can be ignored. Assuming $\alpha$ is roughly constant during two consecutive TTIs, the relation between normalized SIRs for two consecutive TTIs can be expressed as:

$$\frac{g}{I_{TTI2}} = \frac{P_{total\_TTI1}}{P_{total\_TTI2}} \cdot \frac{g}{I_{TTI1}} \quad (5)$$

Figure 3:
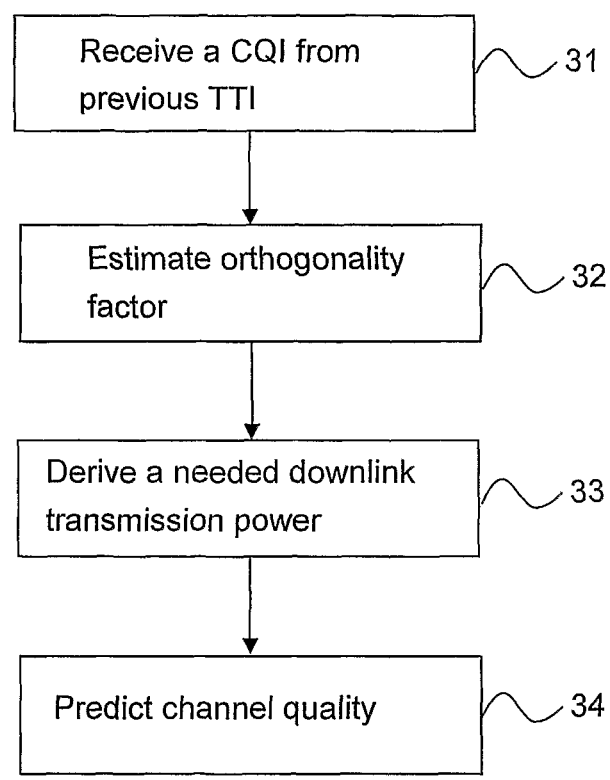
FIG. 3 is a flowchart over a first embodiment of the inventive method.

According to a preferred embodiment of the present invention the procedure for predicting a channel quality on a downlink channel in a communication network comprising a communication network entity 15 transmitting data on said downlink channel over a radio interface to one or more user equipments 18, each of which is transmitting data on an uplink channel to said communication network entity 15 over said radio interface, shown in FIG. 3, is as follows:

1) receiving a channel quality indicator value from said user equipment(s) 18 on said uplink channel (step 31);
2) deriving a needed downlink transmission power (step 32);
3) optionally, estimating an orthogonality factor, $\alpha$, for said downlink channel (step 33) according to the above described equations:
4) predicting a channel quality for the next data transmission on said downlink channel (step 34) based on said received channel quality indicator value, optionally said estimated orthogonality factor and said derived downlink transmission power.

Likewise, according to the preferred embodiment of the present invention the arrangement for predicting a channel quality on a downlink channel in a communication network comprising a communication network entity 15 transmitting data on said downlink channel over a radio interface to one or more user equipments 18, each of which is transmitting data on an uplink channel to said communication network entity 15 over said radio interface, comprises:

1) means for receiving a channel quality indicator value from said user equipment(s) 18 on said uplink channel:
2) means for deriving a needed downlink transmission power;
3) optionally, means for estimating an orthogonality factor, $\alpha$, for said downlink channel according to the above described equations;
4) means for predicting a channel quality for the next data transmission on said downlink channel based on said received channel quality indicator value, optionally said estimated orthogonality factor and said derived downlink transmission power.

In HS systems, conventional power control for associated dedicated physical channel and/or fractional-dedicated physical channel (A-DPCH/F-DPCH) doesn't work properly due to the large intra-cell interference fluctuation, which is caused by the traffic burst leading to the DL carrier power fluctuation.

According to a first preferred embodiment of the present invention, the inventive method is used for obtaining an efficient radio resource utilization, i.e. the inventive method may be applied to improve the power control performance. More specifically, for the first slot of each TTI, the transmission power is adjusted to directly reach the required SIR target while for the other two slots, the transmission power follows transmission power control (TPC) commands from the UE.

Equations (6), (7) and (8) show how to derive the needed transmission power meeting the required SIR target.

$$\text{For } F\text{-}DPCH, CER_{target} \rightarrow SIR_{required} \quad (6)$$
$$\text{For } A\text{-}DPCH, BLER_{target} \rightarrow SIR_{required}$$

$$SIR_{required} = P_{tx} \cdot SF \cdot \frac{g}{I} \quad (7)$$

$$P_{tx} = \frac{SIR_{required}}{SF \cdot \left(\frac{g}{I}\right)} \quad (8)$$

Where $BLER_{target}$ and $CER_{target}$ are the block error rate target and TPC commands error rate target respectively. SF is the spreading factor.

Figure 4:
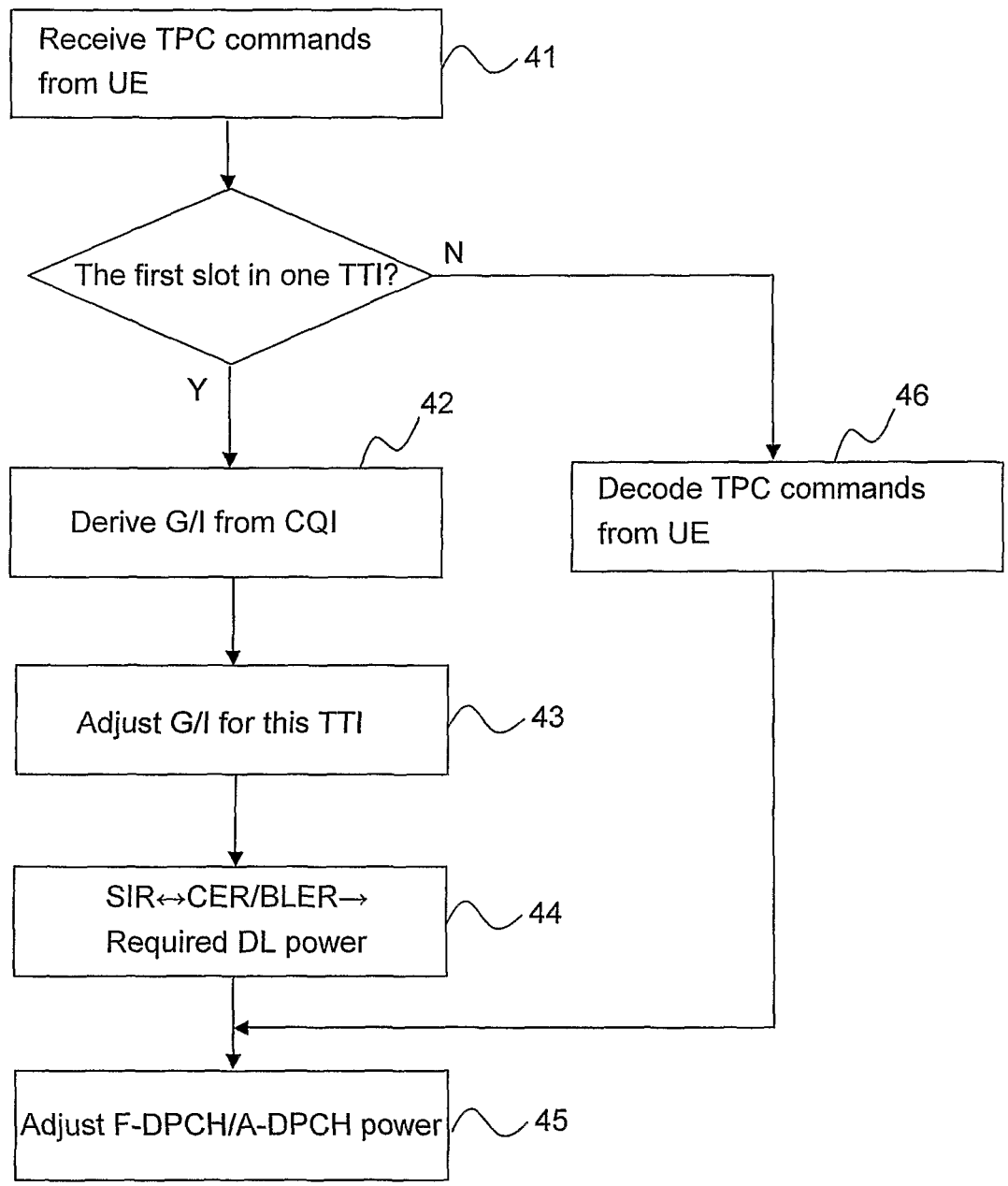
FIG. 4 is a flowchart showing a particular embodiment for using channel quality prediction for obtaining an efficient radio resource utilization.

Thus, the procedure according to the first preferred embodiment for using the channel quality prediction for obtaining an efficient radio resource utilization, shown in FIG. 4, is as follows:

1) receiving transmit power control (TPC) commands on said uplink channel from said user equipment (step 41);
2) monitoring timeslots in a transmission time interval;
3) if the monitored timeslot is the first slot in said transmission time interval, deriving the pathgain over the interference from the received CQI (step 42);
4) adjusting the pathgain over the interference for this first TTI (step 43);
5) calculating a required downlink power based on the predicted channel quality (step 44) according to equations (6)-(8) and,
6) adjusting the transmission power (step 45) based on the calculated downlink power in order to obtain efficient radio resource utilization;
7) otherwise, if the monitored timeslot not is the first slot in said transmission time interval, decoding said received transmit power control commands (step 46) and adjusting transmission power (step 45) based on the decoded transmit power control commands in order to obtain efficient radio resource utilization.

According to a second preferred embodiment of the present invention, the inventive method is used for improving a link adaptation between said communication network entity and said user equipment(s). Since CQI is one of the important inputs for the link adaptation, a good prediction of g/I will be clearly helpful to do right transport format selection including the HS transmission power, transport block size the number of HS codes and modulation scheme.

According to a third preferred embodiment of the present invention, the inventive method is used for obtaining efficient scheduling decisions. For a channel dependent scheduler. CQI is one input to make a queue selection [1], the proposed solution can be applied to improve the scheduling decisions making. As one example, the queue selection might be determined as below:

Queue Selection Coefficient=$f(CQI)*f(delay)*f(average rate)$

The factor f(CQI) controls the efficiency of scheduling from a system throughput perspective by using the CQI value reported by the UE. The factor f(delay) considers the queuing waiting time, i.e. how long time each priority queue has not been selected by scheduler. The factor f(average rate) controls the fairness of scheduling from a user average offered throughput perspective.

In multiple antenna transmission schemes the UE may report CQI for each antenna stream or at least more than one CQI. In some scenarios only a subset of the transmitted antennas may be used by the base station for transmission. Antenna selection can thus be based on the set of reported CQI. For example the stream that would lead to good downlink quality as depicted by the reported CQI may only be used for a particular transmission. Thus, according to a fourth preferred embodiment of the present invention, the CQI is predicted for each antenna stream multiple antenna systems such as beam forming, N×N MIMO etc. The predicted CQI is then used by the base station to select a subset of best antennas stream.

Data packets being sent from a source mobile node to a destination mobile node is typically routed through a number of intermediate mobile nodes (multi-hopping) before reaching the destination mobile node. In multi-hop systems the UE may report to the base station a set of CQI or any other channel quality measure corresponding to all the relays or at least some of the relays served by this base station. Based on the reported CQI, the base station may select the best relay or a subset of N best relays. Thus, according to a fifth preferred embodiment of the present invention, the CQI is predicted for links between each relay and the UE. The predicted CQI is used by the base station to assign the best relay or a subset of N best relays to the UE.

It will be appreciated that at least some of the procedures described above are carried out repetitively as necessary to respond to the time-varying characteristics of the channel between the transmitter and the receiver. To facilitate understanding, many aspects of the invention are described in terms of sequences of actions to be performed by, for example, elements of a programmable computer system. It will be recognized that the various actions could be performed by specialized circuits (e.g. discrete logic gates interconnected to perform a specialized function or application-specific integrated circuits), by program instructions executed by one or more processors, or a combination of both.

Moreover, the invention can additionally be considered to be embodied entirely within any form of computer-readable storage medium having stored therein an appropriate set of instructions for use by or in connection with an instruction-execution system, apparatus or device, such as computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus or device. The computer-readable medium can be, for example but not limited to, an electronic, magnetic, optical, electro-magnetic, infrared, or semiconductor system, apparatus, device or propagation medium. More specific examples (a non-exhaustive list) of the computer-readable medium include an electrical connection having one or more wires, a portable computer diskette, a random access memory (RAM), a read only memory (ROM), an erasable programmable read only memory (EPROM or Flash memory), an optical fibre, and a portable compact disc read only memory (CD-ROM).

Thus, a computer-readable medium containing computer program according to a preferred embodiment of the present invention for predicting a channel quality on a downlink channel in a communication network comprising a communication network entity 15 transmitting data on said downlink channel over a radio interface to one or more user equipments 18, each of which is transmitting data on an uplink channel to said communication network entity 15 over said radio interface, shown in FIG. 3, is provided wherein the computer program performs the steps of:

1) receiving a channel quality indicator value from said user equipment(s) 18 on said uplink channel (step 31);
2) deriving a needed downlink transmission power (step 32);
3) optionally, estimating an orthogonality factor, α, for said downlink channel (step 33) according to the above described equations;
4) predicting a channel quality for the next data transmission on said downlink channel (step 34) based on said received channel quality indicator value, optionally said estimated orthogonality factor and said derived downlink transmission power.

Modifications to embodiments of the invention described in the foregoing are possible without departing from the scope of the invention as defined by the accompanying claims.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

The invention claimed is:

1. A method in a communication network entity in a radio communication network for predicting a channel quality on a downlink channel in the radio communication network, wherein the communication network entity transmits data on the downlink channel over a radio interface to one or more user equipments, each of which transmits data on an uplink channel to the communication network entity over the radio interface, the method comprising the steps of:
   receiving a channel quality indicator value from the one or more user equipments on the uplink channel;
   deriving a needed downlink transmission power based on the received channel quality indicator value;
   estimating an orthogonality factor for the downlink channel; and
   predicting a channel quality for the next data transmission on the downlink channel based on the received channel quality indicator value, the estimated orthogonality factor, and the derived downlink transmission power.

2. The method according to claim 1, wherein the step of estimating an orthogonality factor includes estimating the orthogonality factor based on data from two previous data transmissions.

3. The method according to claim 1, further comprising obtaining efficient utilization of radio resources utilizing the predicted channel quality, the obtaining step including:
   receiving transmit power control (TPC) commands on the uplink channel from a given user equipment;
   monitoring timeslots in a transmission time interval;
   if the monitored timeslot is the first slot in the transmission time interval, calculating a required downlink power based on the predicted channel quality and adjusting transmission power based on the calculated downlink power in order to obtain efficient radio resource utilization; and
   if the monitored timeslot is not the first slot in the transmission time interval, decoding the received transmit power control commands and adjusting transmission power based on the decoded transmit power control commands in order to obtain efficient radio resource utilization.

4. The method according to claim 1, further comprising improving a link adaptation between the communication network entity and the one or more user equipments utilizing the predicted channel quality.

5. The method according to claim 1, further comprising obtaining efficient scheduling decisions utilizing the predicted channel quality.

6. The method according to claim 1, further comprising selecting an antenna stream utilizing the predicted channel quality.

7. An arrangement in a communication network entity in a radio communication network for predicting a channel quality on a downlink channel in the radio communication network, wherein the communication network entity transmits data on the downlink channel over a radio interface to one or more user equipments, each of which transmits data on an uplink channel to the communication network entity over the radio interface, the arrangement comprising:
   means for receiving a channel quality indicator value from the one or ore user equipments on the uplink channel;
   means for deriving a needed downlink transmission power based on the received channel quality indicator value;
   means for estimating an orthogonality factor for the downlink channel; and
   means for predicting a channel quality for the next data transmission on the downlink channel based on the received channel quality indicator value, the estimated orthogonality factor, and the derived downlink transmission power.

8. The arrangement according to claim 7, wherein the means for estimating the orthogonality factor includes estimating the orthogonality factor based on data from two previous data transmissions.

9. The arrangement according to claim 7, further comprising means for obtaining efficient utilization of radio resources utilizing the predicted channel quality, the obtaining means including:
   means for receiving transmit power control (TPC) commands on the uplink channel from a given user equipment;
   means for monitoring timeslots in a transmission time interval;
   means for calculating a required downlink power based on the predicted channel quality and adjusting transmission power based on the calculated downlink power in order to obtain efficient radio resource utilization, if the monitored timeslot is the first slot in the transmission time interval; and
   means for decoding the received transmit power control commands and adjusting transmission power based on the decoded transmit power control commands in order to obtain efficient radio resource utilization, if the monitored timeslot is not the first slot in the transmission time interval.

10. The arrangement according to claim 7, further comprising means for improving a link adaptation between the communication network entity and the one or more user equipments utilizing the predicted channel quality.

11. The arrangement according to claim 7, further comprising means for obtaining efficient scheduling decisions utilizing the predicted channel quality.

12. The arrangement according to claim 7, further comprising means for selecting an antenna stream utilizing the predicted channel quality.

13. A non-transitory computer-readable medium containing a computer program for predicting a channel quality on a downlink channel in a communication network having a communication network entity transmitting data on the downlink channel over a radio interface to one or more user equipments, each of which is transmitting data on an uplink channel to the communication network entity over the radio interface, wherein when the computer program is run on a processor in the communication network entity, the entity performs the steps of:
- receiving a channel quality indicator value from the one or more user equipments on the uplink channel;
- deriving a needed downlink transmission power based on the received channel quality indicator value;
- estimating an orthogonality factor for the downlink channel; and
- predicting a channel quality for the next data transmission on the downlink channel based on the received channel quality indicator value, the estimated orthogonality factor, and the derived downlink transmission power.

* * * * *

UNITED STATES PATENT AND TRADEMARK OFFICE
CERTIFICATE OF CORRECTION

PATENT NO.        : 8,559,999 B2                             Page 1 of 1
APPLICATION NO.   : 12/301854
DATED             : October 15, 2013
INVENTOR(S)       : Hu et al.

It is certified that error appears in the above-identified patent and that said Letters Patent is hereby corrected as shown below:

On the Title Page, in Item [73], under "Assignee", in Column 1, Line 2,
delete "Stockolm" and insert -- Stockholm --, therefor.

In the Specifications

Column 4, Line 30, delete "equations:" and insert -- equations; --, therefor.

Column 4, Line 45, delete "channel:" and insert -- channel; --, therefor.

Column 5, Line 48, delete "selection" and insert -- selection, --, therefor.

Column 5, Line 49, delete "size" and insert -- size, --, therefor.

Column 5, Line 53, delete "scheduler." and insert -- scheduler, --, therefor.

In the Claims

Column 8, Line 23, in Claim 7, delete "or ore" and insert -- or more --, therefor.

Signed and Sealed this
Twenty-ninth Day of April, 2014

Michelle K. Lee
*Deputy Director of the United States Patent and Trademark Office*